United States Patent
Jean-Luc et al.

[11] Patent Number: 6,142,447
[45] Date of Patent: Nov. 7, 2000

[54] TRANSLATION BLOCK WITH DISENGAGING NUT FOR SCREW-MOUNTED LIFTING MECHANISM

[75] Inventors: Andre Jean-Luc, Obernai; Brion Serge, Stutzheim-Offenheim, both of France

[73] Assignee: Lohr Industries, Hangenbieten, France

[21] Appl. No.: 08/978,516

[22] Filed: Nov. 25, 1997

[30] Foreign Application Priority Data

Nov. 26, 1996 [FR] France ................................. 96 14625

[51] Int. Cl.⁷ .................................................. B66F 7/12
[52] U.S. Cl. ..................................... 254/89 R; 254/89 H
[58] Field of Search .................................. 254/89 R, 98, 254/424, 7 R, 7 B, 7 C; 74/89.15, 424.8 R, 440, 441, 409

[56] References Cited

U.S. PATENT DOCUMENTS

| | | | |
|---|---|---|---|
| 3,277,736 | 10/1966 | Goodman | 74/424.8 R |
| 4,302,981 | 12/1981 | Wayman | 74/424.8 R |
| 4,302,982 | 12/1981 | D'Angelo | 74/424.8 R |
| 5,189,923 | 3/1993 | Lashbrook | 74/409 |
| 5,238,654 | 8/1993 | Nohl et al. | 74/424.8 R |

FOREIGN PATENT DOCUMENTS 2 625 187   6/1989   France.

*Primary Examiner*—David A. Scherbel
*Assistant Examiner*—Daniel G. Shanley
*Attorney, Agent, or Firm*—Davis and Bujold

[57] ABSTRACT

The translation block with disengaging nut (15) comprises a translation body (4) which serves as a housing for the nut (15) and which slides along the guide element (7) surrounding the screw. The interior unit comprises the nut (15) formed of two mechanically identical pieces (29, 30) which are attached to the screw (13) and separated by an elastic restraint, and an immobilizing-release device (18) cooperating with blocking grooves (42) on the nut, comprised of two flanges (20, 21) each pivoting on an axle parallel to the screw, elastically joined to the nut and released through the action of a pneumatic force. This invention is of interest to manufacturers of storage devices, for example, screw-mounted lifting mechanisms for vehicle transport trailers.

12 Claims, 5 Drawing Sheets

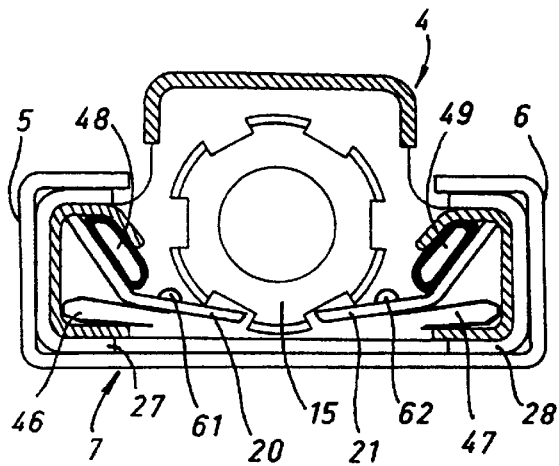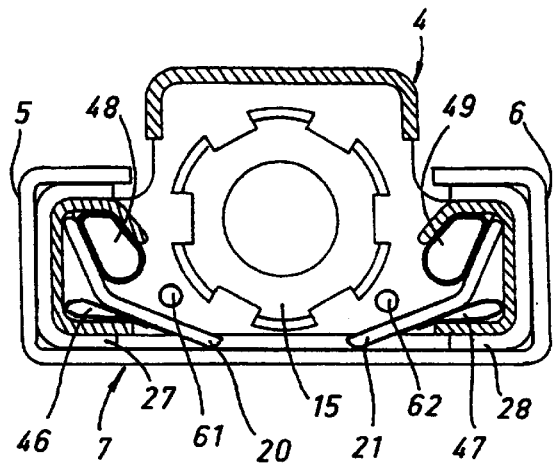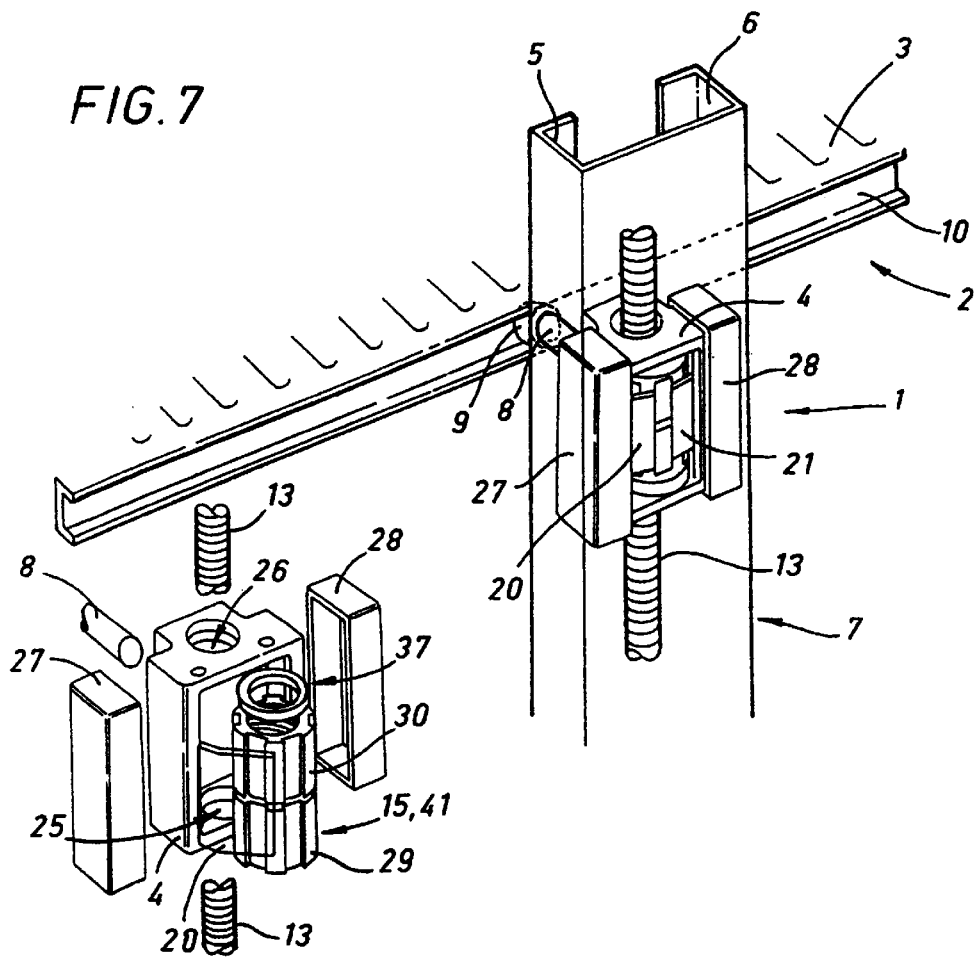

TRANSLATION BLOCK WITH DISENGAGING NUT FOR SCREW-MOUNTED LIFTING MECHANISM

The invention relates to a translation block with a disengaging nut which can be incorporated into a screw-mounted lifting mechanism holding one or more vertically movable support structures. It is used to support platforms or loading platforms for a trailer which transports vehicles or some other specialized transport vehicle equipped with one or more lifting mechanisms.

Screw-mounted lifting mechanisms on vehicle transport trailers are known in the art, in which the screw, enclosed within an element called a post, drives one or more nuts each connected to a support platform by means of a cage forming an interface with the platform.

In general, the screws are opposite each other, forming a pair, to support the platform or plate on a single transverse line.

To completely support a large plate or an extended platform for positioning at numerous angles, a pair of screws is provided near each of its extremities. These angles correspond to the positions of the nuts in each pair on their respective screws.

Such vehicles are generally equipped with several movable plates or platforms, each connected to the pairs of lifting screws by supporting translation nuts. Thus, it is possible to have several stages in the loading process, each corresponding to a particular nut on the screw. Therefore, there can be several supporting nuts on the same screw.

Since vehicles must be loaded on the platforms in succession, the various loading supports must move independently.

If two translation nuts are supported by the same screw, the required independent movement can only be accomplished if each nut is individually controlled due to the unique character of the propelling force procured by the screw.

That is the role of the nut when engaged on the screw. This type of nut is known and is conventionally called a disengaging nut.

One known type of disengaging nut is described in French Patent No. 2 625 187 in the name of LOHR INDUSTRIE.

It consists of a guided mechanical body sliding within the internal sides of a post along lateral runners. The runners are attached to the sides of the sliding mechanical body, which is pivotably connected by the tip of an axle or otherwise articulated to a support plate. The sliding body serves as a cage for a threaded socket attached to the screw and rotating in contact with the upper sub-surface of the sliding body. There are controlled connection-disconnection means between the threaded socket and a coaxial structure, which is either fixed or affixed in rotation on the mechanical body for the purpose of, first, allowing the sliding mechanical body to be displaced in translation when propelled by the screw on the threaded socket, and second, to leave the screw free of translation effects and allow the socket to turn freely on the rotating connection.

According to the embodiment described, the connection-disconnection means consists of an upper toothed element and a lower toothed element on the end portion, one on the lateral surface of the socket and the other opposite it on an intermediate element which can be moved axially either closer or farther away by means of a mechanical shaft element.

The rotating connector consists of a ball bearing stop.

Thus, by controlling the means for separating or bringing together these elements, the threaded socket can be rendered movable or immobile in rotation about itself and also in translation along the screw.

This embodiment is complex in both form and construction.

In practice, the above invention requires two small cylinders which are sensitive to pollution and other specialized elements that are costly to manufacture.

Moreover, the corresponding toothed elements must conform to each peripheral circular element opposite it and must be perfectly complementary to it.

Another factor is the relatively large amount of noise made during operation.

In addition, because of vibrations, the nut can shift even when disengaged.

The design of the disengaging nut makes it impossible to detect signs of wear, and it is not easily accessible.

Finally, if force is applied to the nut from the opposite direction, the device cannot function.

The goal of the present invention is to overcome these disadvantages by proposing a translation block with a disengaging nut that is reliable and easy to attach, and with components that are easy to manufacture.

To achieve this, the present invention provides a translation block with a disengaging nut for screw-mounted lifting mechanisms, particularly units connected to a carrying structure on a road vehicle, comprising a nut maintained in a mechanical element sliding along a guide element propelled by a nut traversing the sliding element, with the translation block comprising a device for immobilizing-releasing the nut from rotation on itself, characterized in that:

the nut may consist of two identical elements mechanically separated by an interval;

a rotating connector joins the loaded end of the nut to each of the upper and lower walls of the sliding element;

the nut has longitudinal axial grooves on its lateral surface;

the immobilizing-release device consists of two flanges each pivoting on an axis parallel to the axis of the screw, while the free ends of the flanges each engage in one groove of the screw;

the flanges on the mechanism are each elastically attached to the nut and are each activated, to open, by a pushing force.

This invention has numerous, multiple advantages. Its primary features are as follows:

The nut is a safety nut because:

it is easy to detect wear;

the flexible end connections to the adjacent walls of the translation element effectively filter mechanical vibrations and thus prevent the nut from moving when disengaged;

the disengagement mechanism provides a particular degree of safety, since the flanges automatically close and ensure that the nut remains immobilized if the control means malfunctions or is not present;

the dimensions of the movable mechanical unit are such that the complete unit, particularly the flanges, fits on the screw;

the controlling force is pneumatic: this energy is available on the truck and is not affected by pollution, as no moving pieces are used in a pneumatic circuit;

the nut floats within the block using elastic connections, allowing a certain independence of movement between the housing and improving the functional reliability of the unit;

the nut functions in the same manner regardless of the direction of the force applied to it, and can therefore function in a horizontal position;

since the block has symmetrical right/left and upper/lower portions, it is completely functionally reversible;

there is a marked reduction in noise during use;

since the nut is made of two pieces which are separated by a space, functional play is decreased;

when unlocked, the flanges on the disengagement mechanism contact the internal surface of the post, thus wedging the translation block against the post and improving reliability;

the unit is protected from all external influences, particularly weather extremes and ultraviolet rays.

Other features and advantages of the invention will become apparent from the following description, given by way of example, and the accompanying drawings, in which:

FIGS. 5 and 6 are detailed perspectives in cross-section showing the disengaging device in two states;

FIG. 7 is a general perspective view of one exemplary application of a single translation block with disengaging nut, with a simplified, exploded view of the nut showing only its essential elements;

Figure 8:
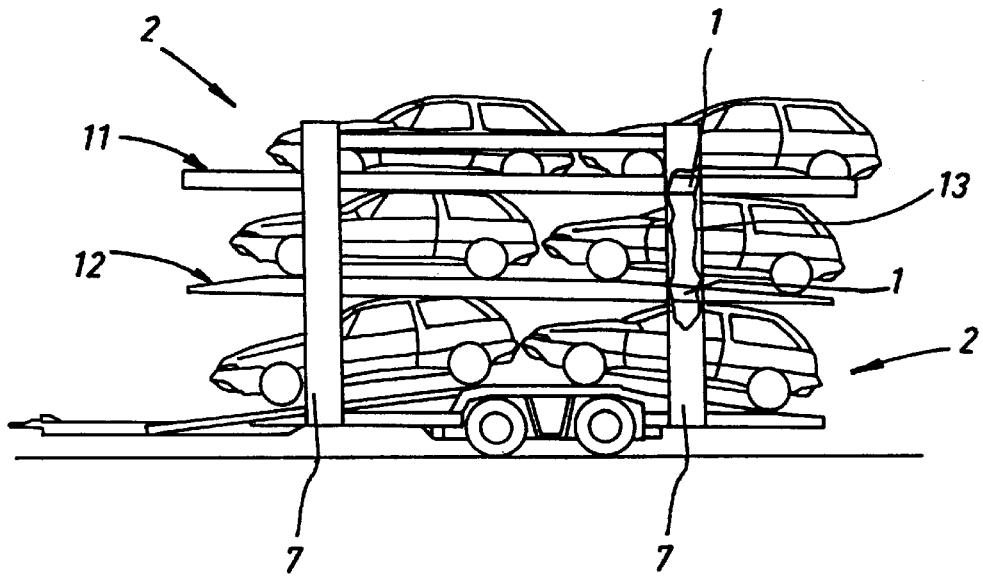
FIG. 8 is a general perspective view showing one application for a vehicle transport trailer with two movable platforms.
Figure 9:
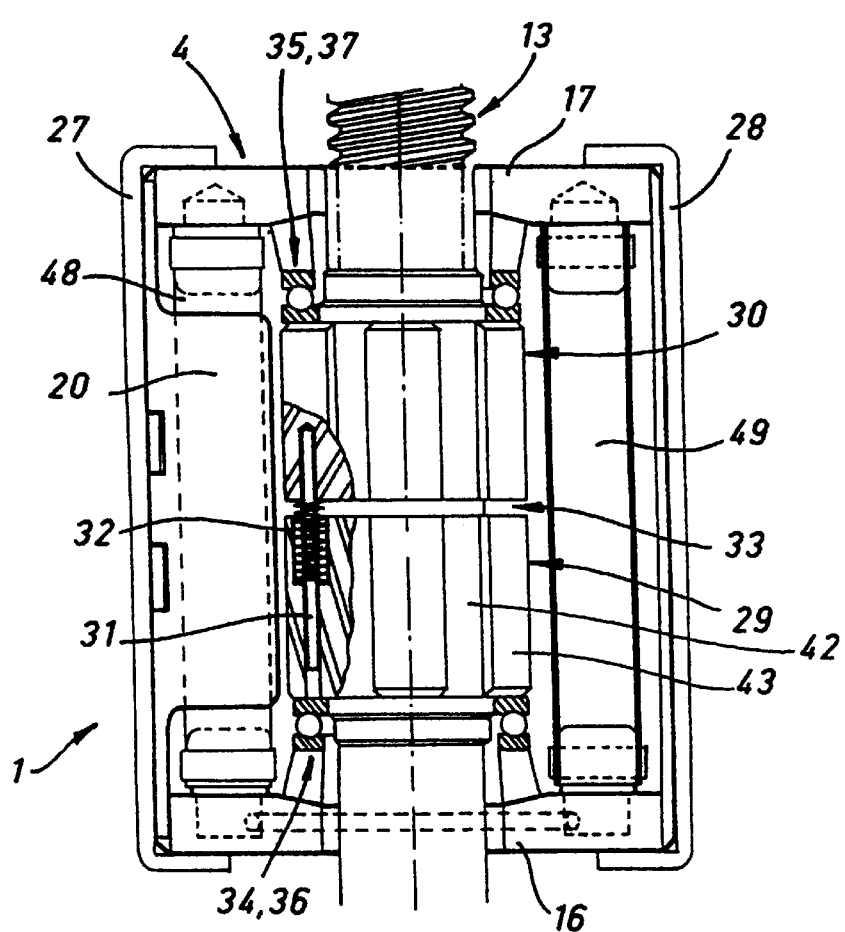
FIG. 9 is an enlarged view of each block referenced in FIG. 8.

In one application of the invention, translation block 1, which may be combined with other similar blocks, forms a screw-mounted lifting device 2, used for example, on a support platform 3, particularly for vehicles as shown in FIGS. 7 and 8.

For this purpose, translation block 1 is formed of a mechanical body 4 sliding along runners, for example, the internal structures of sides 5 and 6 of guide elements such as element 7, which may be C-shaped, each surrounding a lifting screw. When arranged vertically, these guide elements are protected by body structures known as posts, as shown in the drawings. Of course, other arrangements are possible, notably a horizontal disposition.

This mechanical body 4 is connected to a supporting structure, for example, using a pivoting connection such as the tip of shaft 8 forming an interface with supporting structure 3. This interface is integral with the rear surface of mechanical body 4. If necessary, the free end of the tip of shaft 8 may include a guide wheel 9 or sliding elements displaceable along element 10 on the edge of the longitudinal beam of the support structure.

The mechanical body may also be connected to the adjacent supporting structure in some other way.

To provide complete independence of movement between the movable platforms such as platforms 11, 12 in the various loading stages (FIG. 8), with movement originating from the effects of a single screw 13 through the guide elements such as element 7, that is, for each vertical line of contact points, there are attached to each single screw 13 as many translation blocks I as there are movable supporting platforms or more generally, supporting structures 11, 12, for example, two platforms, as shown in FIG. 8.

The operating environment of each translation block is shown in FIGS. 7 and 8.

FIG. 7 shows translation block 1 and its main components in the accompanying exploded drawing, as well as screw 13 housed within guide element 7 and a perforated metal support platform 3 to which it is connected by an interface, for example, a pivoting connector such as the tip of shaft 8, guide wheel 9, and edge element 10.

The translation block 1 with disengaging nut of the invention is composed of the following general elements.

A mechanical body 4 sliding along a structure forming a guide element 7 and provided with an interface 8 mechanically connected to a support plate 3 serves as a housing 14 for a disengaging nut 15 housed within said body and attached to the loaded extremity, that is, located on the side of the load on the base 16 or the arch 17 of housing 14. If it is to function in reverse, each of the free upper and lower extremities of the disengaging nut 15 rotates on base 16 and arch 17 of housing 14.

Disengaging nut 15 is immobilized and then released from rotation by an immobilizing-release device 18. This device also causes nut housing 14 to become wedged in disengaged position against an element on portion 19 of the post opposite the open front surface of housing 14. This device comprises two pivoting lateral flanges 20 and 21, each released from rotation by a force such as a pneumatic force, and replaced into a permanent blocked position by an elastic force.

Next, the specific elements shown in the drawings will be described in detail.

The translation block 1 with disengaging nut 15 is a unit formed of a mechanical body 4 in the form of housing 14, having an open front surface, a fall rear surface 22, and lateral walls 23 and 24, as well as lower and upper transverse walls respectively forming base 16 and arch 17, all relatively thick. The latter have generally conical interior surfaces, each traversed by a cylindrical channel 25 opening into a smooth circular opening 26 forming the passageway for lifting screw 13 traversing mechanical translation body 4 from side to side.

Figure 1:
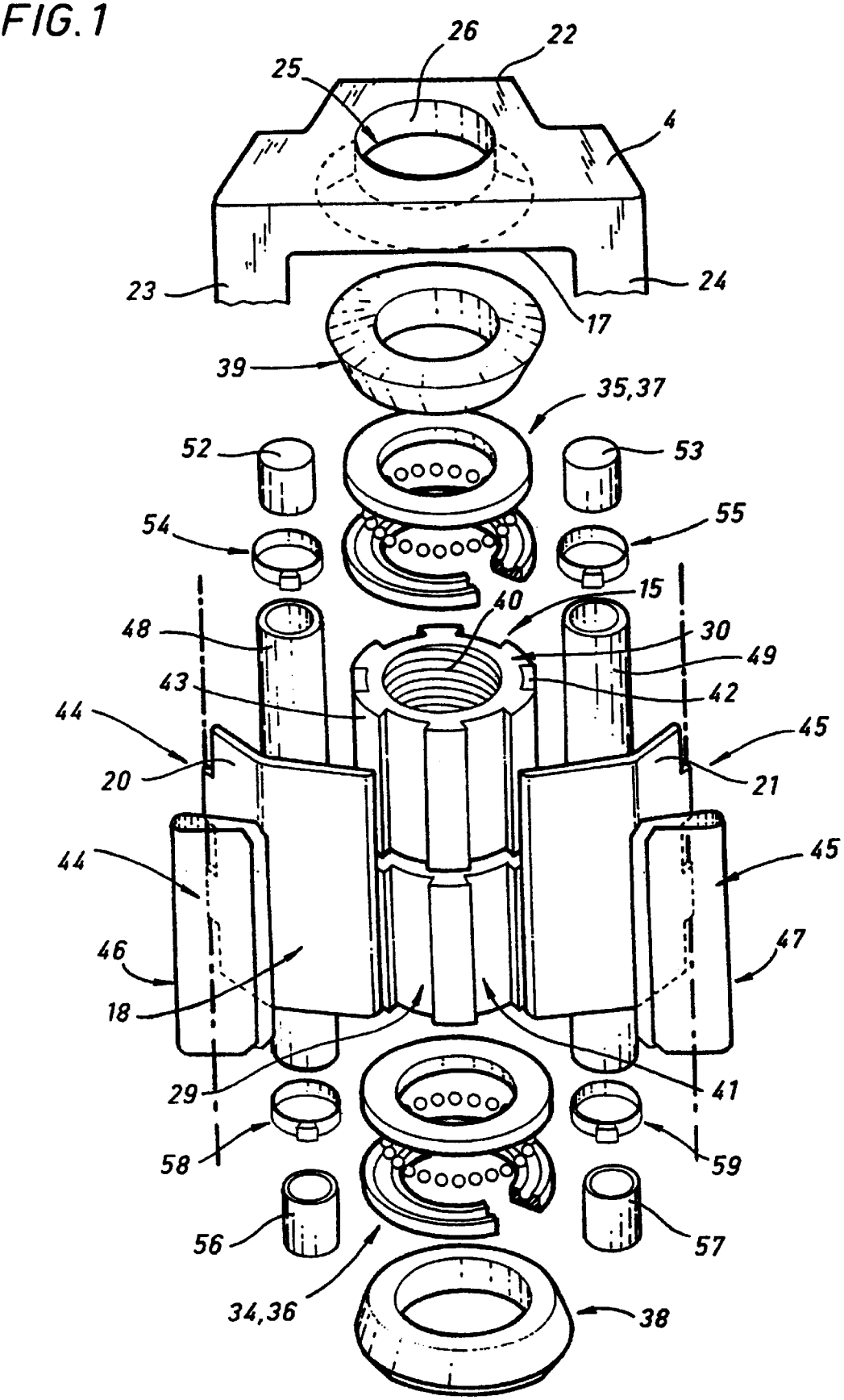
FIG. 1 is a general perspective view showing the exploded translation block with disengaging nut according to the invention.
Figure 2:
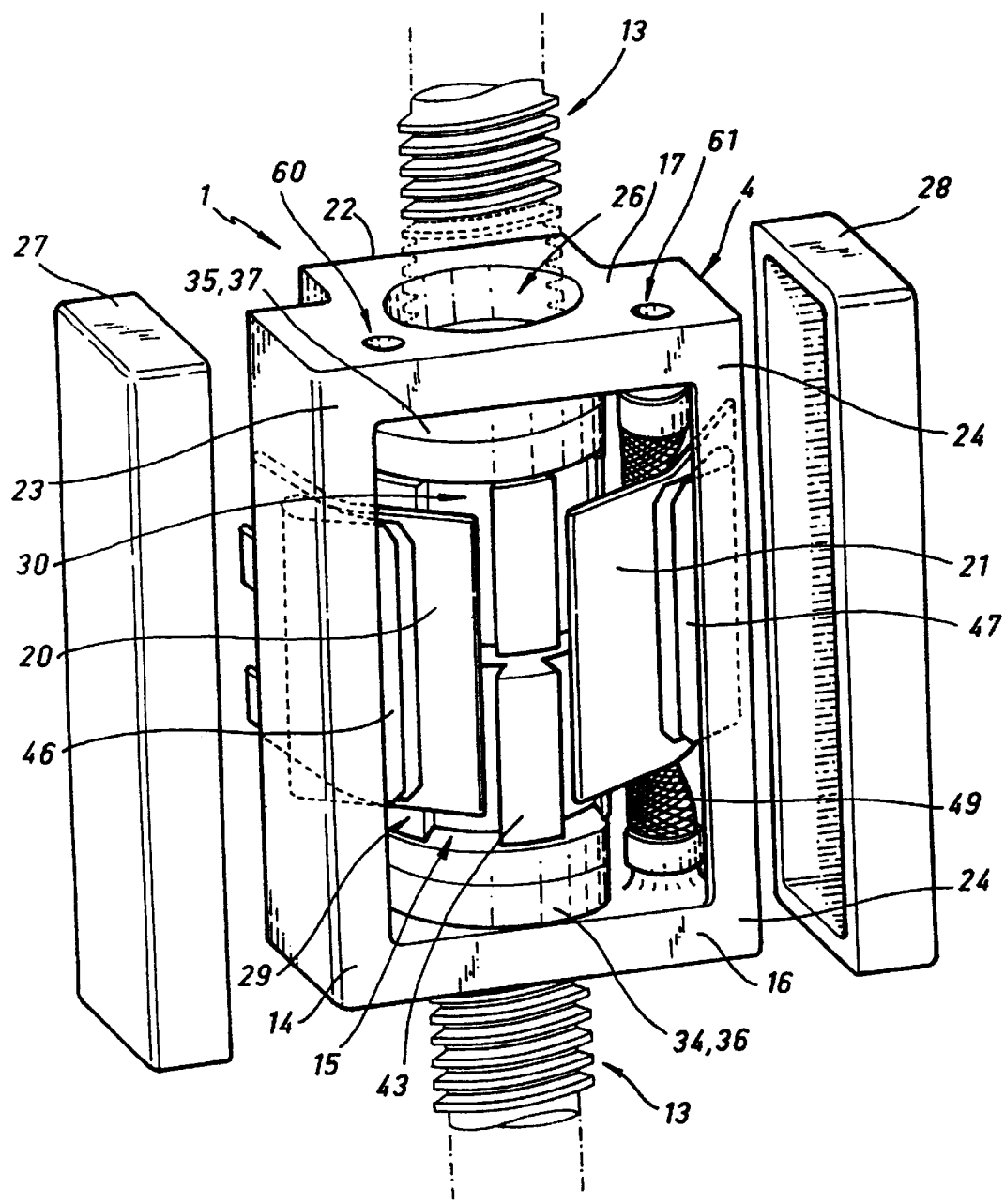
FIG. 2 is a perspective view of the assembled translation block.

Mechanical translation body 4 slides along each guide element 7, either directly, using its internal side structures 5 and 6, or using removable slide elements 27 and 28 which constitute anti-friction elements that are interchangeable when worn (FIG. 2).

Mechanical translation body 4 houses disengaging nut 15 mounted on lifting screw 13. According to one advantageous embodiment, the latter may consist of two nut pieces 29, 30 which may be, but are not necessarily, the same length, attached to the screw in identical pairs, for example, using three twin shafts such as shaft 31 which are longitudinal and parallel to each other and to the axis of the screw.

The two nut pieces 29, 30 are maintained at a specified distance from each other using an elastic recall separating force which may be furnished by a spring, such as spring 32, coaxially mounted on each twin shaft 31. This elastic separating restraint provides better contact between the nut elements and the screw, and gives rise to an empty space or interval 33 between the two surfaces opposite the nut pieces, an interval which varies in length depending upon how worn these pieces are.

This particular design makes it possible to judge the degree of wear either visually or using a probe.

Nut pieces 29, 30 are advantageously made of plastic material, preferably self-lubricating.

This unit of translation nut pieces 29, 30 is mounted on screw 13 and wedged by at least its free, charged end; that is, the end situated near the load. In the case of the reversible version shown, each of its free ends is wedged against the wall of base 16 and arch 17, respectively, by a lower rotating connection 34 and an upper connector 35, using an upper and a lower bearing stop 36 and 37, respectively, in each instance. The connector itself is wedged against the opposite wall portion, which is generally conical, by a lower annular cushion 38 and a generally truncated upper cushion 39 to ensure a flexible connection for filtering mechanical vibrations and providing some elastic play between nut 15 and translation body 4.

Nut pieces 29, 30 are generally cylindrical and hollow, with a step-like internal surface shaped to accommodate thread 40 which attaches them to lifting screw 13, and a crenelated external lateral surface 41, which is visible in the drawings. There is a regular succession of axial grooves such as grooves 42, which are generally rectangular, defining axial teeth 43, which are vertical and generally trapezoidal.

This toothed arrangement forms the blocking structures which cooperate with the free longitudinal ends of pivoting lateral flanges 20, 21 of the immobilization-release device 18. Their shape is generally angled and each one is pivotably articulated by a hinged articulation 44, 45 to an axis parallel to screw 13 on the adjacent lateral wall 23, 24 of the sliding mechanical body 4. These flanges are symmetrically disposed in relation to the axis of the screw. When at rest, the angled pivoting flanges 20, 21 are folded back toward the blocking structures whose extremities are immobilized within the grooves, each flange being influenced by an elastic recall force. This force may be furnished by a spring with an angled plate 46, 47 contacting, on one side, the return of the adjacent lateral wall 23, 24 of the sliding body, and on the other side, the cheek of pivoting flange 20, 21.

Figure 3:
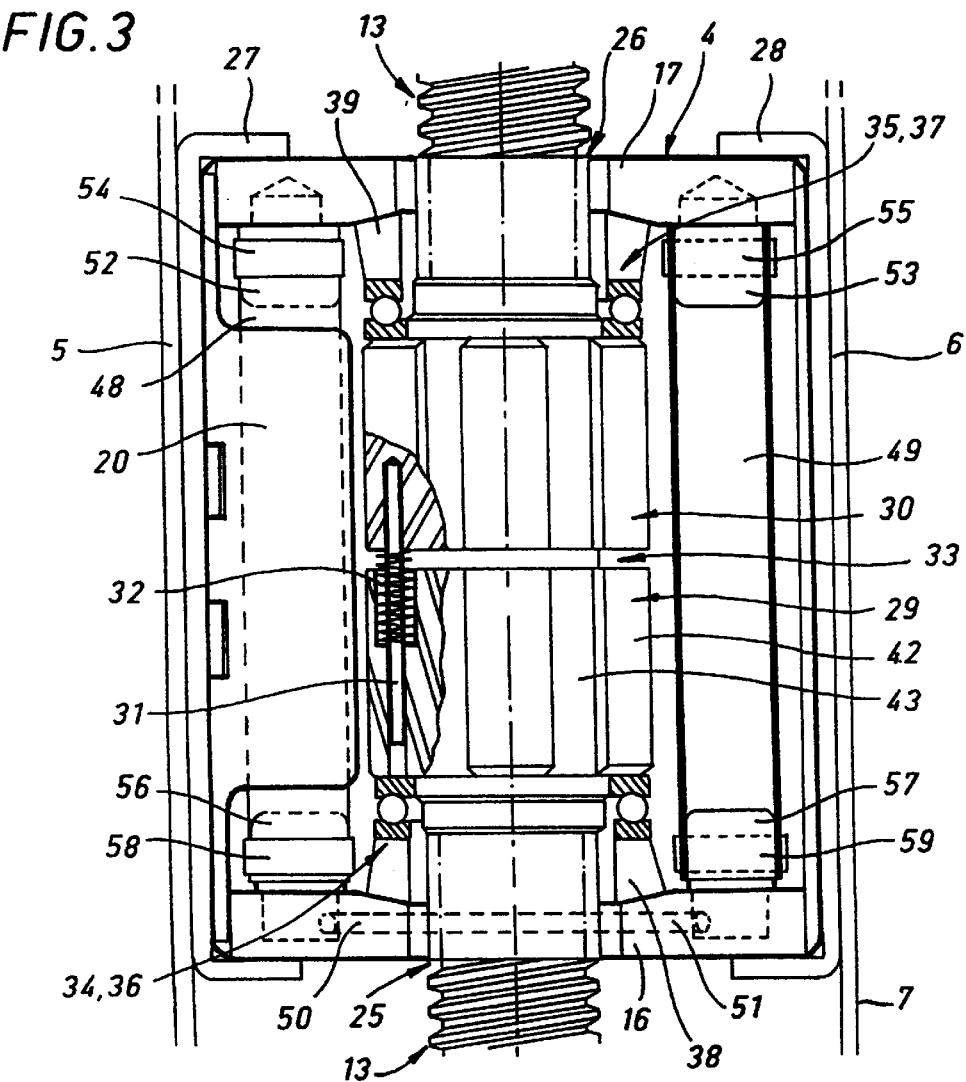
FIGS. 3 and 4 are first, a mixed cross-section view with a cut-away plan view on a twin shank, and second, a transverse cross-section taken between the two pieces of the nut showing the tip of the interface shaft.
Figure 4:
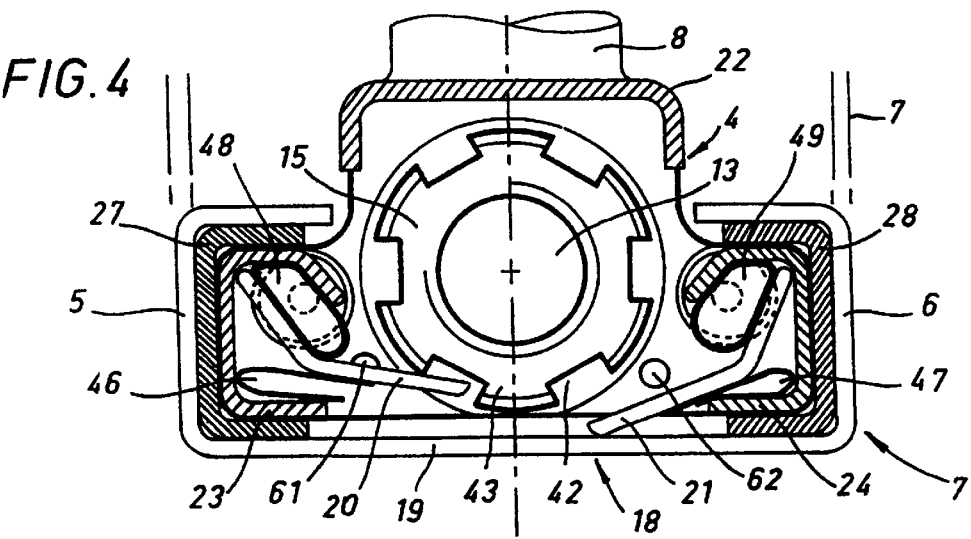

Each pivoting flange 20, 21 is actuated to disengage by a pushing force, preferably pneumatic energy, for example, using a flexible, inflatable tube 48, 49 or especially a flat flexible pipe filled with compressed air through supply channels 50, 51 which may be formed in base wall 16 of translation body 4 (FIG. 3). Each inflatable tube 48, 49 pushes against the rear surface of each flange 20, 21. Its length corresponds to the height of the flange. As each tube is pressurized, it inflates to its full height. This transverse deformation is used as a pushing force to provoke a slight pivoting of the flange as it encounters the recall force, but nevertheless sufficient to extract the extremity of each flange from the axial blocking groove 42 and thereby free nut 15 which, driven by screw 13, turns upon itself, using bearing stops 36 and 37 as a turning connection.

When disengaged, the flanges of the immobilization-release device 18 push against the wall opposite guide element 7, immobilizing translation body 4 by wedging it against the internal surface of the internal side structures 5 and 6.

This configuration is the disengagement configuration in which screw 13 rotates nut 15 without causing any translational movement. It corresponds to active control.

This is a temporary state. It is a working state because, once the driving pneumatic force is suppressed, flange 20, 21 automatically returns to the resting configuration in which the nut is blocked and causes translational movement along guide element 7.

Flexible tubes or pipes 48, 49 are attached at one of their extremities by fitting them onto a stopping and maintenance element 52, 53 with collar 54, 55. They are attached in the same way at their opposite end to a tip 56, 57 with collar 58, 59, but communicate through channels 50, 51, respectively, with a source of compressed air from a distributor (not shown).

For manual operation in case of a mechanical breakdown, pins or shafts may be introduced through upper perforations 60 and 61 (FIG. 2) and lower perforations 62 and 63 respectively formed in the walls of the arch 17 and of the base 15 of housing 14. The pins or shafts are introduced to manually manipulate the pivoting flanges and thus manually disengage the nut.

Next, the operation of the elements described above will be explained.

There are two operational modes.

The first is the propelled mode, that is, when nut 15 is immobilized in rotation. This is the permanent or resting mode because of the elastic return forces which push the flanges into axial grooves 42 in position for immobilizing the nut.

In this mode, nut 15 is immobile in relation to mechanical block 4, which it maintains in translation by converting the rotational movement of the screw.

The second mode is the controlled mode, in which the nut rotates freely. Under the influence of the pneumatic force transmitted through inflatable tubes 48, 49, the flanges pivot and disengage from grooves 42, thus releasing nut 15 from rotating upon itself by contacting the rotating elements on the two end bearing stops 36, 37.

Nut 15 turns with the screw and does not transmit any linear displacement force along the guide element to sliding body 4 articulated to the adjacent supporting structure.

What is claimed is:

1. A screw driven translation block with a disengageable nut, for supporting a load on a vehicle, comprising:

a nut (15) having an external surface formed by longitudinal, axial grooves (42) separated by toothed elements (43);

a mechanical body (4) housing said nut (15), said mechanical body being in slidable contact with a guide element (7);

a screw (13), for rotationally driving said nut (15) and said mechanical body (4), in threaded communication with said nut (15) such that said screw traverses said mechanical body (4); and, an immobilizing and releasing device in communication with said nut (15) and said mechanical body (4) for at least one of immobilizing and releasing said nut (15) from rotation about said screw (13), said immobilizing and releasing device having:

a rotating connector for joining a free, loaded end of said nut (15) to an adjacent transverse wall of said mechanical body (4);

a flexible connection for joining said rotating connector to an upper portion of said adjacent transverse wall of said mechanical body (4);

at least two pivoted flanges (20, 21), each of said pivoted flanges (20,21) having a free end pivoting about an axis parallel to the rotation axis of said nut (15), each pivoted flange (20,21) having an associated inflatable tube (48, 49), the free end of each articulated flange being biased by a spring into engagement with one of said axial grooves (42) of the nut (15) to prevent rotation of the nut (15) in at least one direction, and each of the associated inflatable tubes, when inflated, biases the free end of the associated pivoted flange out of engagement with the axial grooves (42) to facilitate rotation of said nut (15) in at least one direction.

2. The translation block according to claim 1, wherein said rotating connector joins each of said free ends of said nut to said transverse wall opposite said mechanical body (4).

3. The translation block according to claim 1, wherein said rotating connectors are bearing stops (36, 37).

4. The translation block according to claim 1, wherein said the rotating connectors (34,35) rest on a flexible element contacting said translation block.

5. The translation block according to claim 1, wherein said nut is formed of two identical pieces (29, 30) mechanically separated by an interval (33).

6. The translation block according to claim 5, wherein said nut pieces are mechanically identical.

7. The translation block according to claim 5, wherein said pieces of said nut are subject to an elastic separating force.

8. The translation block according to claim 5, wherein said nut pieces (29, 30) each have axial grooves (42) on a lateral surface separated by toothed elements (43).

9. The translation block according to claim 8, wherein said axial grooves (42) are generally rectangular in shape and said toothed elements are generally trapezoidal in shape.

10. The translation block according to claim 1, wherein said pushing force exerted on said immobilizing and releasing device to activate each of the flanges is a pneumatic force.

11. The translation block according to claim 1, wherein said pivoting flanges on said immobilizing and releasing device are caused to pivot and open by a flexible tube (48, 49) inflated with compressed air, which is at least equal in length to a height of said flange.

12. The translation block according to claim 1, wherein when disengaged, said flanges (20, 21) on said immobilizing and releasing device push against said adjacent wall opposite said guide element (7).

* * * * *